(12) United States Patent
Kim et al.

(10) Patent No.: US 12,382,274 B2
(45) Date of Patent: Aug. 5, 2025

(54) ELECTRONIC DEVICE FOR SUPPORTING DEVICE-TO-DEVICE COMMUNICATION AND METHOD THEREFOR

(71) Applicant: Samsung Electronics Co., Ltd., Suwon-si (KR)

(72) Inventors: Hyoungkwon Kim, Suwon-si (KR); Inhye Yeom, Suwon-si (KR); Jungmin Oh, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 331 days.

(21) Appl. No.: 18/160,635

(22) Filed: Jan. 27, 2023

(65) Prior Publication Data

US 2023/0171580 A1    Jun. 1, 2023

Related U.S. Application Data

(63) Continuation of application No. PCT/KR2021/009881, filed on Jul. 29, 2021.

(30) Foreign Application Priority Data

Aug. 7, 2020   (KR) .................. 10-2020-0099331

(51) Int. Cl.
*H04W 4/00*    (2018.01)
*H04W 8/00*    (2009.01)
*H04W 48/18*   (2009.01)

(52) U.S. Cl.
CPC .......... *H04W 8/005* (2013.01); *H04W 48/18* (2013.01)

(58) Field of Classification Search
CPC ........ H04W 4/00; H04W 8/005; H04W 48/18

USPC ........................................... 370/329
See application file for complete search history.

(56) References Cited

U.S. PATENT DOCUMENTS

| 8,326,294 | B2* | 12/2012 | Narang | H04W 48/16 |
| | | | | 370/332 |
| 9,113,399 | B2* | 8/2015 | Murgan | H04W 48/16 |
| 9,369,950 | B2 | 6/2016 | Berggren et al. | |
| 9,432,922 | B1 | 8/2016 | Song et al. | |

(Continued)

FOREIGN PATENT DOCUMENTS

| CN | 106464396 A | 2/2017 |
| KR | 10-2011-0028003 A | 3/2011 |

(Continued)

*Primary Examiner* — Marceau Milord
(74) *Attorney, Agent, or Firm* — Jefferson IP Law, LLP

(57) ABSTRACT

An electronic device is provided. The electronic device includes a wireless communication circuit, a memory for storing an EARFCN list, and a processor configured to identify whether the electronic device is in a designated mode, when the electronic device is in the designated mode, perform a scan sequentially on at least some channels from among a plurality of channels included in the EARFCN list, when a first channel satisfying a first condition is identified as a result of the scan, identify whether the first channel corresponds to a second condition by decoding a system information block (SIB) or a master information block (MIB) received through the first channel, when the first channel satisfies the second condition, select a cellular network regarding the first channel, and when the first channel does not satisfy the second condition, stop the scan and perform D2D communication during a designated time.

18 Claims, 11 Drawing Sheets

(56) References Cited

U.S. PATENT DOCUMENTS

| | | |
|---|---|---|
| 9,572,171 B2 * | 2/2017 | Li .................... H04W 48/12 |
| 9,730,092 B2 | 8/2017 | Jung et al. |
| 9,807,811 B2 | 10/2017 | Jung et al. |
| 10,038,993 B2 | 7/2018 | Lim et al. |
| 10,136,405 B2 | 11/2018 | Song et al. |
| 10,165,533 B2 | 12/2018 | Feng et al. |
| 10,257,729 B2 * | 4/2019 | Carbajal ............. H04L 27/00 |
| 10,455,491 B2 | 10/2019 | Kim et al. |
| 10,498,951 B2 * | 12/2019 | Kleinbeck ........... G08B 29/185 |
| 10,616,829 B2 | 4/2020 | Kim et al. |
| 10,694,562 B2 * | 6/2020 | Su .................... H04W 76/14 |
| 10,735,915 B2 | 8/2020 | Hyun et al. |
| 10,771,560 B2 * | 9/2020 | Ananda ............... H04W 56/001 |
| 10,772,038 B2 | 9/2020 | Kim et al. |
| 10,868,626 B2 * | 12/2020 | Chiang ............... H04J 11/0069 |
| 11,343,656 B2 | 5/2022 | Hyun et al. |
| 2011/0117911 A1 * | 5/2011 | Narang ............... H04W 48/16 455/434 |
| 2013/0183904 A1 * | 7/2013 | Hiben ................ H04W 36/20 455/63.1 |
| 2014/0269875 A1 | 9/2014 | Garcia et al. |
| 2015/0296391 A1 | 10/2015 | Kotkar et al. |
| 2015/0334637 A1 | 11/2015 | Kim et al. |
| 2015/0358894 A1 | 12/2015 | Berggren et al. |
| 2016/0192310 A1 * | 6/2016 | Sorrentino ........... H04J 3/0638 370/350 |
| 2016/0269953 A1 | 9/2016 | Jung et al. |
| 2017/0078865 A1 | 3/2017 | Santhanam et al. |
| 2017/0290075 A1 * | 10/2017 | Carbajal ............. H04L 27/00 |
| 2018/0007621 A1 | 1/2018 | Kim et al. |
| 2018/0007622 A1 | 1/2018 | Kim et al. |
| 2018/0199352 A1 | 7/2018 | Zitzmann et al. |
| 2019/0124586 A1 * | 4/2019 | Sahin ................. H04W 48/16 |
| 2019/0208112 A1 | 7/2019 | Kleinbeck |
| 2020/0236173 A1 * | 7/2020 | Ananda .............. H04W 48/16 |
| 2021/0067282 A1 * | 3/2021 | Yan .................... H04L 5/001 |
| 2021/0092701 A1 | 3/2021 | Feng et al. |

FOREIGN PATENT DOCUMENTS

| | | |
|---|---|---|
| KR | 10-2014-0068088 A | 6/2014 |
| KR | 10-2014-0080398 A | 6/2014 |
| KR | 10-2014-0108844 A | 9/2014 |
| KR | 10-2018-0050198 A | 5/2015 |
| KR | 10-2016-0116333 A | 10/2016 |
| KR | 10-2016-0144476 A | 12/2016 |

* cited by examiner

ELECTRONIC DEVICE FOR SUPPORTING DEVICE-TO-DEVICE COMMUNICATION AND METHOD THEREFOR

CROSS-REFERENCE TO RELATED APPLICATION(S)

This application is a continuation application, claiming priority under § 365(c), of an International application No. PCT/KR2021/009881, filed on Jul. 29, 2021, which is based on and claims the benefit of a Korean patent application number 10-2020-0099331, filed on Aug. 7, 2020, in the Korean Intellectual Property Office, the disclosure of which is incorporated by reference herein in its entirety.

BACKGROUND

1. Field

The disclosure relates to an electronic device supporting device-to-device (D2D) communication and a method thereof.

2. Description of Related Art

Researches are carried out with respect to various methods of device-to-device communication (D2D). The device-to-device communication may also be referred to as proximity service (ProSe) communication. For example, the device-to-device communication includes direct communication between electronic devices. The 3rd Generation Partnership Project (3GPP), which is a standard organization, supports direct communication with a technique referred to as sidelink. For another example, the device-to-device communication may be performed using a base station. The base station may allocate a frequency band for the device-to-device communication.

The necessity of the device-to-device communication is expected to increase in special situations such as catastrophic situations that cause massive group communication or situations in which public safety is required to be secured. Researches are carried out with respect to mission critical push-to-talk (MCPTT) related to communication for such special purposes.

The above information is presented as background information only to assist with an understanding of the disclosure. No determination has been made, and no assertion is made, as to whether any of the above might be applicable as prior art with regard to the disclosure.

SUMMARY

An electronic device may perform device-to-device communication with an external electronic device in an off-network mode. The off-network mode may be construed as a state in which the electronic device is not located within the coverage of an arbitrary cellular network.

The electronic device in the off-network mode may attempt to access a network when the electronic device is in a specified mode. For example, the specified mode includes a network preferred mode.

When the electronic device is in the network preferred mode, the electronic device may attempt to access a network while performing device-to-device communication. The electronic device may simultaneously perform scanning channels included in an evolved-universal terrestrial radio access (E-UTRA) absolute radio frequency channel number (EARFCN) list and data packet transmission/reception for device-to-device communication. However, when decoding a master information block (MIB) or system information block (SIB) received through a scanned channel, the electronic device cannot transmit/receive packets for device-to-device communication. Therefore, when the electronic device attempts to access a network, loss may occur in a data packet for device-to-device communication received from an external electronic device.

Aspects of the disclosure are to address at least the above-mentioned problems and/or disadvantages and to provide at least the advantages described below. Accordingly, an aspect of the disclosure is to provide an electronic device supporting device-to-device (D2D) communication and a method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a wireless communication circuit, a memory, in which an evolved-universal terrestrial radio access (E-UTRA) absolute radio frequency channel number (EARFCN) list is stored, and at least one processor operatively connected to the wireless communication circuit and the memory, wherein the at least one processor may be configured to identify whether the electronic device is in a specified mode, sequentially perform scanning at least a portion of a plurality of channels included in the EARFCN list when the electronic device is in the specified mode, when a first channel satisfying a first condition is identified as a result of the scanning, identify whether the first channel corresponds to a second condition by decoding a system information block (SIB) or master information block (MIB) received through the first channel, select a cellular network for the first channel when the first channel satisfies the second condition, and stop scanning and perform device-to-device (D2D) communication for a specified time when the first channel does not satisfy the second condition.

In accordance with another aspect of the disclosure, a method of operating an electronic device is provided. The method includes identifying whether the electronic device is in a specified mode, sequentially performing scanning at least a portion of a plurality of channels included in an EARFCN list when the electronic device is in the specified mode, when a first channel satisfying a first condition is identified as a result of the scanning, identifying whether the first channel corresponds to a second condition by decoding a system information block (SIB) or master information block (MIB) received through the first channel, selecting a cellular network for the first channel when the first channel satisfies the second condition, and stopping scanning and performing D2D communication for a specified time when the first channel does not satisfy the second condition.

According to embodiments of the disclosure, an electronic device may prevent unnecessary scan by configuring and updating an EARFCN list.

According to embodiments of the disclosure, an electronic device may reduce the probability of loss of a data packet by performing device-to-device communication for a specified time after decoding an MIB or SIB.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
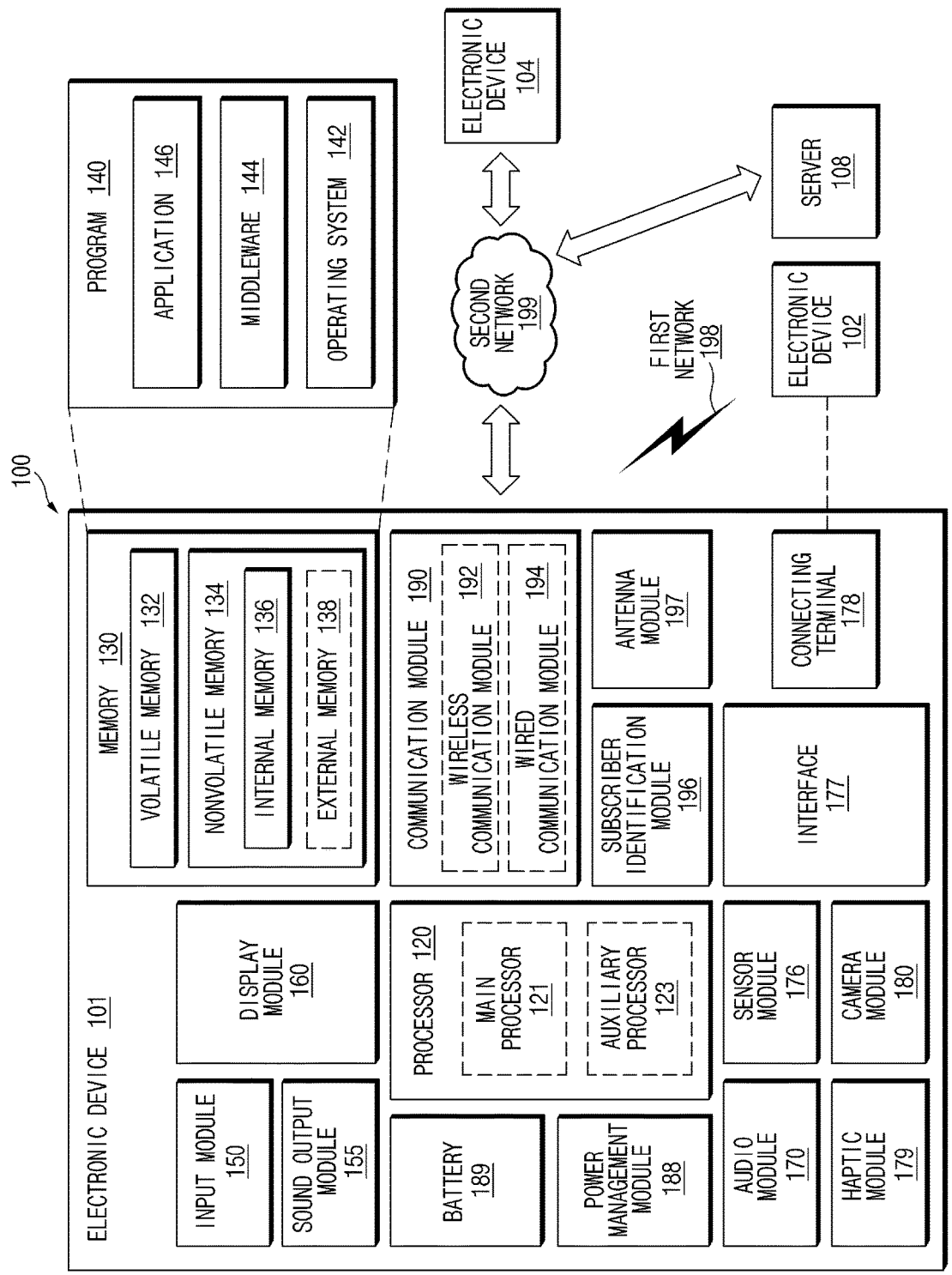
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In other embodiments, some of the components (e.g., the sensor module 176, the camera module 180, or the antenna module 197) may be implemented as a single component (e.g., the display module 160).

The processor 120 may be configured to execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. When the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor, a communication processor, and the like) may be implemented as part of another component (e.g., the camera module 180 or the communication module 190) functionally related to the auxiliary processor 123. According to another embodiment, the auxiliary processor 123 (e.g., the neural processing unit) may include a hardware structure specified for artificial intelligence model processing. For example, an artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may be configured to store various data used by at least one component (e.g., the processor 120 or the sensor module 176) of the electronic device 101. The various data may include, for example, software (e.g., the program 140) and input data or output data for a command related thereto. In an embodiment, the memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. In an embodiment, the input module 150 may include, for example, a microphone, a mouse, a keyboard, a key (e.g., a button), a digital pen (e.g., a stylus pen), and the like.

The sound output module 155 may output sound signals to the outside of the electronic device 101. In an embodiment, the sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. In an embodiment, the display module 160 may include, for example, a display, a hologram device, or a projector and control circuitry to control a corresponding one of the display, hologram device, and projector. According to another embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. In an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, and the like.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). In an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to one embodiment, the haptic module 179 may include, for example, a motor, a piezoelectric element, an electric stimulator, and the like.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may be configured to support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. In an embodiment, the wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. In another embodiment, the wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 database (Db) or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197.

According to some embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

In an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to another embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to yet another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. In an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. In an embodiment, the machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

In an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to other embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to still other embodiments, operations performed by the module, the program, or another component may be carried out sequentially, in parallel, repeatedly, or heuristically, or one or more of the operations may be executed in a different order or omitted, or one or more other operations may be added.

Figure 2:
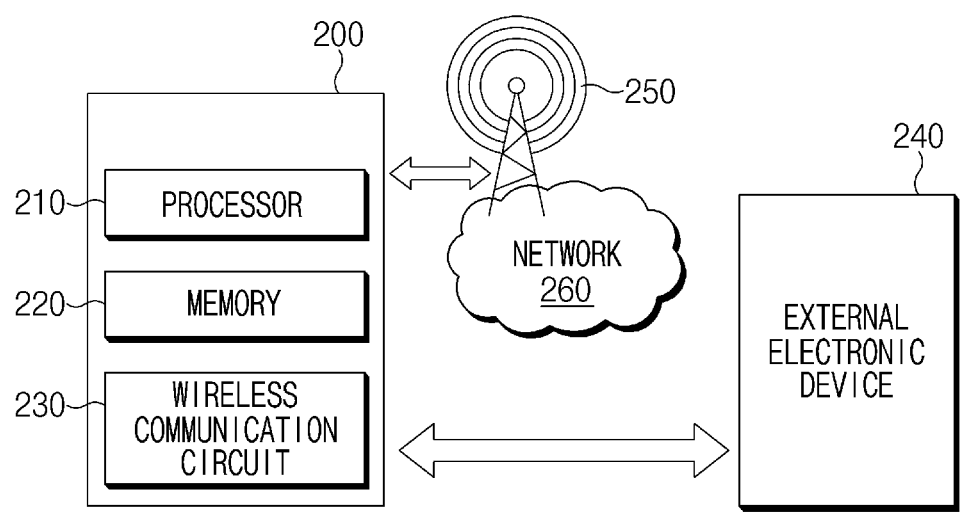
FIG. 2 illustrates an environment of communication of an electronic device with an external electronic device according to an embodiment of the disclosure.

FIG. 2 illustrates an environment of communication of an electronic device with an external electronic device according to an embodiment of the disclosure.

In an embodiment, an electronic device 200 (e.g., 101 of FIG. 1) may include a processor 210 (e.g., 120 of FIG. 1), a memory 220 (e.g., 130 of FIG. 1), and/or a wireless communication circuit 230. The configuration of an electronic device 200 illustrated in FIG. 2 is exemplary, and embodiments of the disclosure are not limited thereto. For example, the electronic device 200 may further include a component not illustrated in FIG. 2 (e.g., the battery 189 of FIG. 1).

According to another embodiment, the processor 210 may be operatively connected to the memory 220 and/or the wireless communication circuit 230. The processor 210 may control the components of the electronic device 200. For example, the processor 210 may control the components of the electronic device 200 according to one or more instructions stored in the memory 220. In yet another embodiment, the processor 210 may include an application processor and/or a communication processor. The processor 210 may be configured with a single chip or a plurality of chips.

In an embodiment, the wireless communication circuit 230 may provide communication with an external electronic device 240 (e.g., the electronic device 102 or electronic device 104 of FIG. 1) to the electronic device 200. For example, the wireless communication circuit 230 may be configured to communicate with the external electronic device 240 via a network 260 (e.g., the second network 199 of FIG. 1) (e.g., a cellular network). The network 260 may include a base station 250. The network 260 may include a general cellular communication network (e.g., long term evolution (LTE) commercial communication network) and/or a disaster and safety communication network. For another example, the wireless communication circuit 230 may be configured to communicate with the external electronic device 240 based on device-to-device (D2D) communication (e.g., sidelink communication).

According to another embodiment, the electronic device 200 may perform D2D communication with the external electronic device 240 in the off-network mode. For example, the off-network mode may mean a state in which the electronic device 200 is not located within a coverage of any cellular network. In still another embodiment, the processor 210 may transmit/receive a data packet for D2D communication with the external electronic device 240 using the wireless communication circuit 230. The D2D communication is unidirectional communication (e.g., half-duplex), and, for example, the electronic device 200 is unable to receive a data packet from the external electronic device 240 while transmitting a data packet to the external electronic device 240.

The electronic device 200 in the off-network mode may operate based on preference information (e.g., network preferred mode). For example, the electronic device 200 may periodically attempt to search for the base station 250 and/or access the network 260 in order to detect whether the electronic device 200 is located within coverage of a cellular network. When the electronic device 200 attempts to search for the base station 250 and/or access the network 260, loss may occur in a data packet for D2D communication. For example, the processor 210 may receive an MIB or SIB through a channel in which effective energy has been detected. While decoding a received MIB or SIB, the processor 210 is unable to perform D2D communication (e.g., data packet reception) with the external electronic device 240. In this case, loss of a data packet for D2D communication may occur.

Figure 3:
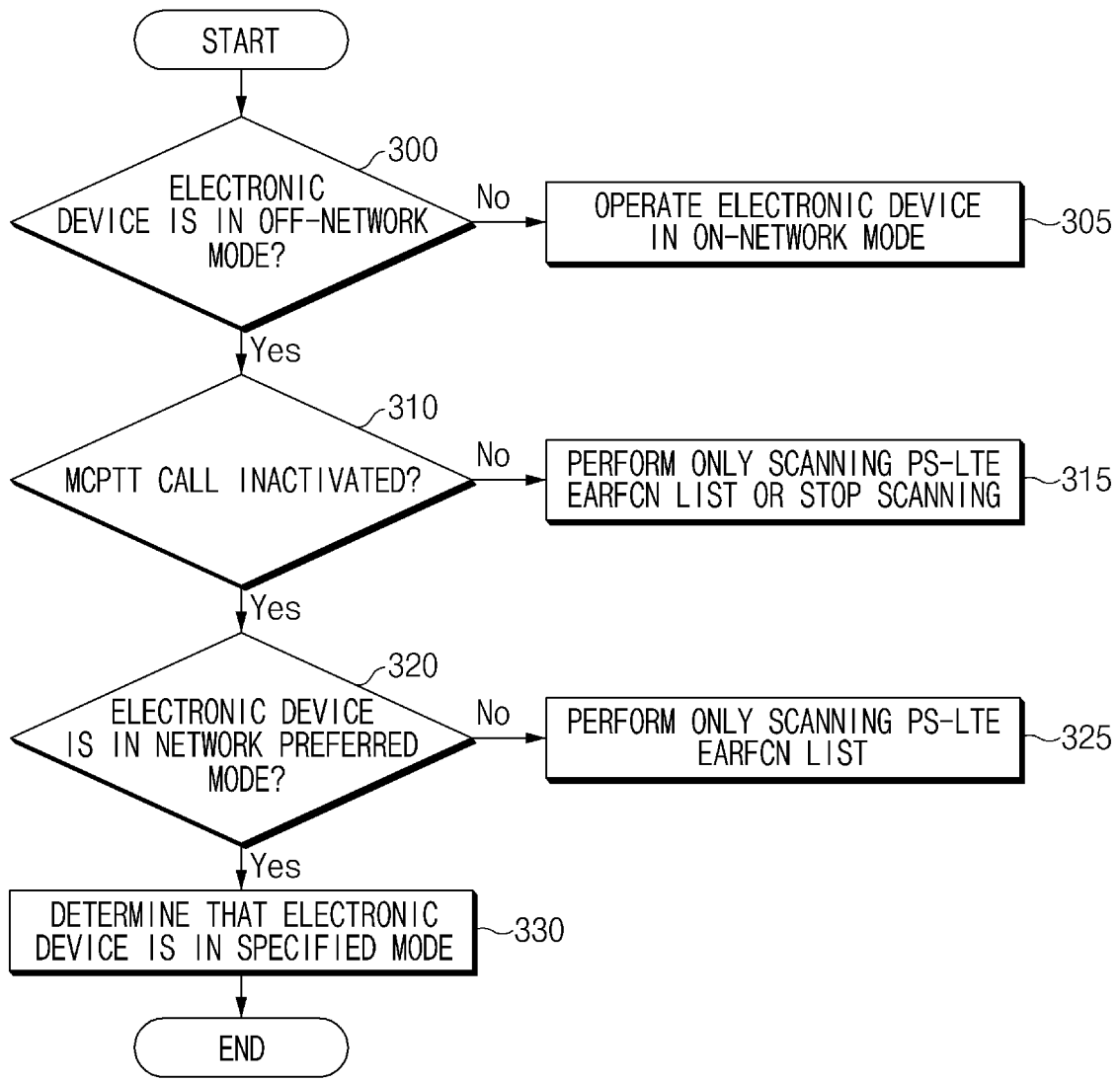
FIG. 3 is a flowchart illustrating a specified mode according to an embodiment of the disclosure.

FIG. 3 is a flowchart illustrating a specified mode according to an embodiment of the disclosure.

In operation 300, a processor (e.g., 210 of FIG. 2) may identify whether an electronic device (e.g., 200 of FIG. 2) is in the off-network mode. For example, in a case where an electronic device 200 is configured to perform D2D communication, a processor 210 may search for a frequency and channel (e.g., disaster and safety communication network) specified for D2D communication. When the specified frequency and channel are not discovered, the processor 210 may determine that the electronic device 200 is in the off-network mode. The off-network mode may be construed as a state in which the electronic device 200 is not located within coverage of an arbitrary cellular network.

In an embodiment, when the electronic device 200 is not in the off-network mode (300-NO), the processor 210 may proceed to operation 305. In operation 305, the processor 210 may operate the electronic device 200 in an on-network mode. Descriptions related to FIG. 10 may be referenced with regard to the electronic device 200 operating in the on-network mode.

In another embodiment, when the electronic device 200 is in the off-network mode (300-YES), the processor 210 may proceed to operation 310. In operation 310, the processor 210 may identify whether mission-critical push-to-talk (MCPTT) Call is inactive. For example, when the electronic device 200 transmits a data packet for D2D communication to an external electronic device (e.g., 240 of FIG. 2) or receives a data packet for D2D communication from the external electronic device 240, the processor 210 may determine that the electronic device 200 is in an MCPTT Call active state.

In yet another embodiment, when MCPTT Call is active (310-NO), the processor 210 may proceed to operation 315. In operation 315, the processor 210 may only perform scanning an EARFCN list corresponding to a disaster and safety communication network (public safety long-term evolution (PS-LTE)) or may stop EARFCN scanning Information about the EARFCN list corresponding to a disaster and safety communication network may be stored in a memory (e.g., 220) of the electronic device 200. In an embodiment, the processor 210 may receive, from a provider, the EARFCN list corresponding to a disaster and safety communication network. According to another embodiment, the processor 210 may receive, from a provider, the EARFCN list corresponding to a disaster and safety communication network among EARFCN lists stored in an electronic device which has successfully accessed a network. The processor 210 may minimize influence of the scanning of the EARFCN list on the MCPTT Call by performing operation 315.

When the MCPTT Call is inactive (310-YES), the processor 210 may proceed to operation 320. In operation 320, the processor 210 may identify whether the electronic device 200 is in a network preferred mode. For example, when the electronic device 200 is in the network preferred mode, the processor 210 may attempt to access a network. When having successfully accessed a network, the processor 210 may switch the electronic device 200 from the off-network mode to the on-network mode. In an embodiment, the processor 210 may provide a user with a user interface related to the network preferred mode. The electronic device 200 may operate in the network preferred mode based on a user input to the user interface. According to another embodiment, when the electronic device 200 is in the network preferred mode, the processor 210 may scan not only the disaster and safety communication network EARFCN list but also the EARFCN list for general cellular communication.

In an embodiment, when the electronic device 200 is not in the network preferred mode (320-NO), the processor 210 may proceed to operation 325. In operation 325, the processor 210 may scan only the disaster and safety communication network (PS-LTE) EARFCN list.

In another embodiment, when the electronic device 200 is in the network preferred mode (320-YES), the processor 210 may proceed to operation 330. The processor 210 may determine that the electronic device 200 is in a specified mode.

Figure 4:
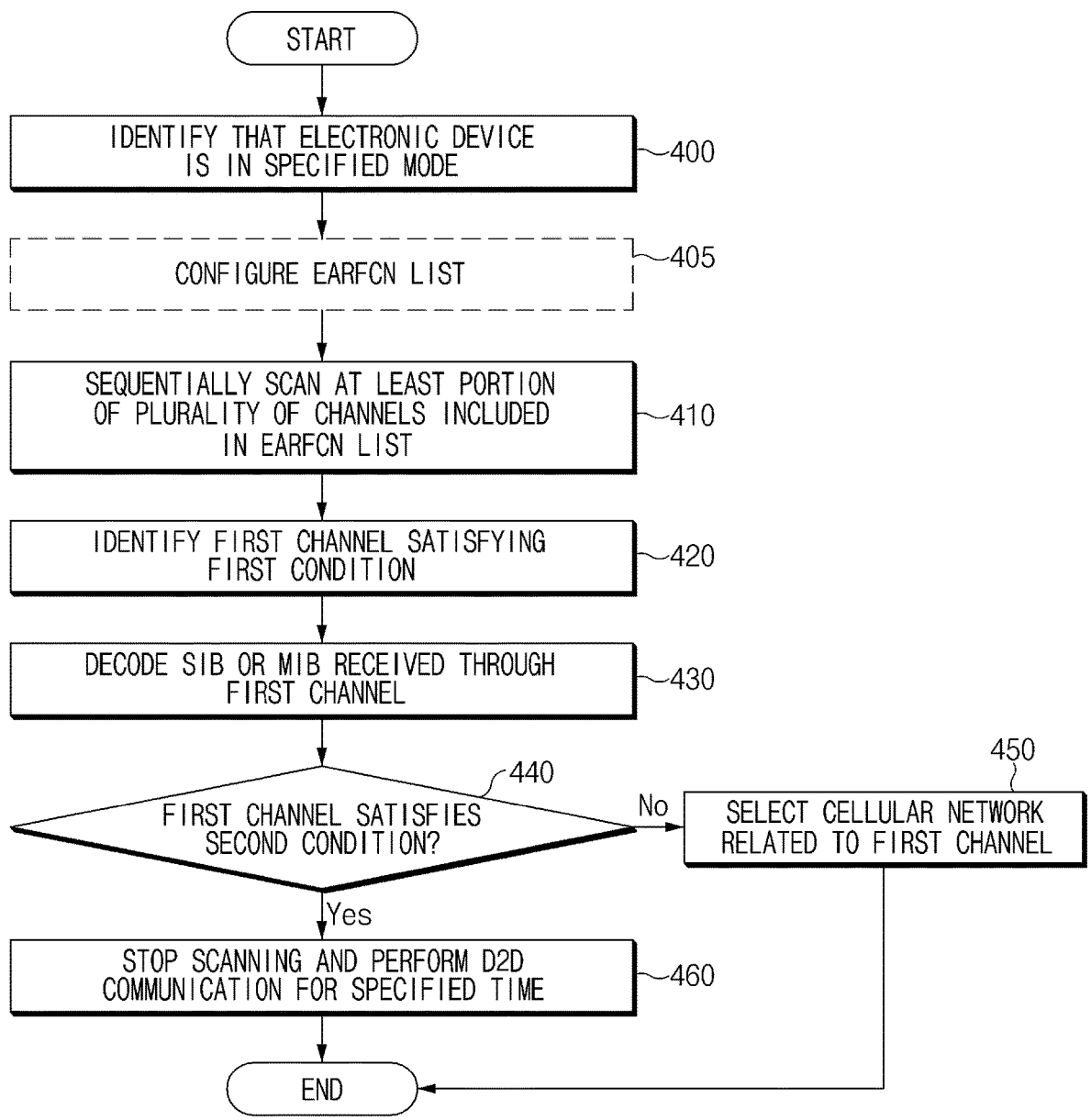
FIG. 4 is a flowchart illustrating D2D communication of an electronic device according to an embodiment of the disclosure.

FIG. 4 is a flowchart illustrating D2D communication of an electronic device according to an embodiment of the disclosure.

In operation 400, a processor (e.g., 210 of FIG. 2) may identify whether an electronic device (e.g., 200 of FIG. 2) is in a specified mode. The descriptions related to FIG. 3 may be referenced with regard to the specified mode.

In operation 405, the processor 210 may configure an evolved-universal terrestrial radio access (E-UTRA) absolute radio frequency channel number (EARFCN) list. Operation 405 is optional and may be skipped. For example, the EARFCN list may be organized based on an EARFCN list, which has succeeded in registering with an existing network (or accessing a network), stored in the electronic device 200 and/or another electronic device (e.g., the electronic device 101 of FIG. 1). In an embodiment, the processor 210 may prevent omission of a channel due to frequency policy change by a network provider by using the EARFCN list of the electronic device 200 which has succeeded in registering with a network. For another example, the EARFCN list may be specified by a network provider. In another embodiment, the processor 210 may prevent an unnecessary attempt to decode MIB or SIB by scanning the EARFCN list specified by a network provider.

According to an embodiment, the processor 210 may remove a barred EARFCN from the EARFCN list. For example, when the processor 210 repeatedly fails to read an SIB received through an arbitrary channel, the processor 210 may specify an EARFCN corresponding to the channel as an EARFCN barred for a preset time (Tbarred). The preset time may be measured by a timer. When the timer of the Tbarred EARFCN has not expired at the time of organizing the EARFCN list, the processor 210 may remove an EARFCN set as a Tbarred EARFCN from the EARFCN list. When the timer of the Tbarred EARFCN has expired at the time of organizing the EARFCN list, an EARFCN for which Tbarred setting has been released may be included in the EARFCN list. In another example, when the processor 210 decodes an MIB or SIB received through an arbitrary channel, and, as a result of the decoding, a cellular network related to the channel is a barred cellular network, the processor 210 may set, as a barred EARFCN, an EARFCN corresponding to the channel in the EARFCN. When organizing the EARFCN list, the processor 210 may remove a barred EARFCN from the EARFCN. According to another embodiment, the EARFCN list may include an EARFCN corresponding to a disaster and safety communication network (public safety long-term evolution (PS-LTE)) for D2D communication and/or an EARFCN for general cellular communication. The disaster and safety communication network (PS-LTE) may be construed as a network reserved for emergency access. In an embodiment, when the electronic device 200 supports D2D communication and the processor 210 is able to authenticate and identify the electronic device 200 for the disaster and safety communication network (PS-LTE) using a subscriber identification module (e.g., 196 of FIG. 1) installed in the electronic device 200, the processor 210 may access the disaster and safety communication network (PS-LTE). According to yet another embodiment, the disaster and safety communication network (PS-LTE) may be provided in a frequency band different from that of a general cellular communication network. The disaster and safety communication network (PS-LTE) may be provided in a specified frequency band (e.g., low-frequency band) among LTE frequency bands provided by a provider. A general cellular communication network may be provided in a frequency band other than the frequency band of the disaster and safety communication network (PS-LTE) among LTE frequency bands provided by a provider. According to an embodiment, the frequency band in which the disaster and safety communication network (PS-LTE) is provided may be provided for D2D communication only in a particular situation (e.g., disaster situation). The frequency band in which the disaster and safety communication network (PS-LTE) is provided may be used, for example, for a general cellular communication network not in a particular situation (e.g., disaster situation).

In operation 410, the processor 210 may sequentially scan at least some channels among a plurality of channels included in the EARFCN list. According to an embodiment, the processor 210 may identify public land mobile network (PLMN) information by decoding MIB or SIB information obtained by scanning channels included in the EARFCN list. For example, the PLMN information may include network provider information. In an embodiment, the processor 210 may identify whether a network related to a corresponding channel is supported by a network provider stored in a subscriber identification module (e.g., 196 of FIG. 1) of the electronic device 200 by identifying the PLMN information. For example, the PLMN information received from the disaster and safety communication network (PS-LTE) may include a PLMN-ID that is different from that of the PLMN information received from a general cellular communication network. In another embodiment, the processor 210 may identify whether the network related to a corresponding channel is the disaster and safety communication network (PS-LTE) or a general cellular communication network by identifying the PLMN-ID. For example, the processor 210 may sequentially scan channels in the EARFCN list in ascending order of EARFCN number. The order of scanning a plurality of channels is an example, and embodiments of the disclosure are not limited thereto.

In operation 420, the processor 210 may identify a first channel satisfying a first condition. For example, the channel satisfying the first condition may be construed as a channel in which effective energy has been detected. Descriptions related to FIG. 5 may be referenced with regard to the first condition and an operation of identifying the first channel satisfying the first condition. In an embodiment, when the first channel satisfying the first condition is identified, the processor 210 may proceed to operation 430.

In operation 430, the processor 210 may receive an MIB or SIB through the first channel, and may decode the received MIB or SIB. While decoding the MIB or SIB, the processor 210 is unable to receive a data packet for D2D communication from an external electronic device (e.g., 240 of FIG. 2). Therefore, in operation 430, loss of a data packet for D2D communication may occur.

In operation 440, the processor 210 may identify whether the first channel satisfies a second condition. Descriptions related to FIGS. 6A and 6B may be referenced with regard to the second condition.

When the first channel does not satisfy the second condition (440-NO), the processor 210 may proceed to operation 450. In operation 450, the processor 210 may select a cellular network related to the first channel In an embodiment, the processor 210 may switch the electronic device 200 to the on-network mode and perform cellular communication (e.g., LTE communication) using a wireless communication circuit (e.g., 230 of FIG. 2). The on-network mode may be construed as a mode in which the processor 210 may perform D2D communication using a cellular network. The electronic device 200 in the on-network mode may use a radio resource of a cellular network for D2D communication.

When the first channel satisfies the second condition (440-YES), the processor 210 may proceed to operation 460. In operation 460, the processor 210 may stop scanning and may perform D2D communication for a specified time. For example, the processor 210 may receive a data packet for D2D communication from the external electronic device 240. The external electronic device 240 may retransmit a data packet, which may be lost due to MIB or SIB decoding by the electronic device 200. In another embodiment, the processor 210 may compensate for data packet loss by receiving retransmission of a data packet. According to an embodiment, the processor 210 may reduce a probability of loss of a data packet by stopping scanning for a specified time after finishing scanning the first channel. Descriptions related to FIGS. 7 and 8 may be referenced with regard to operation 460.

Figure 5:
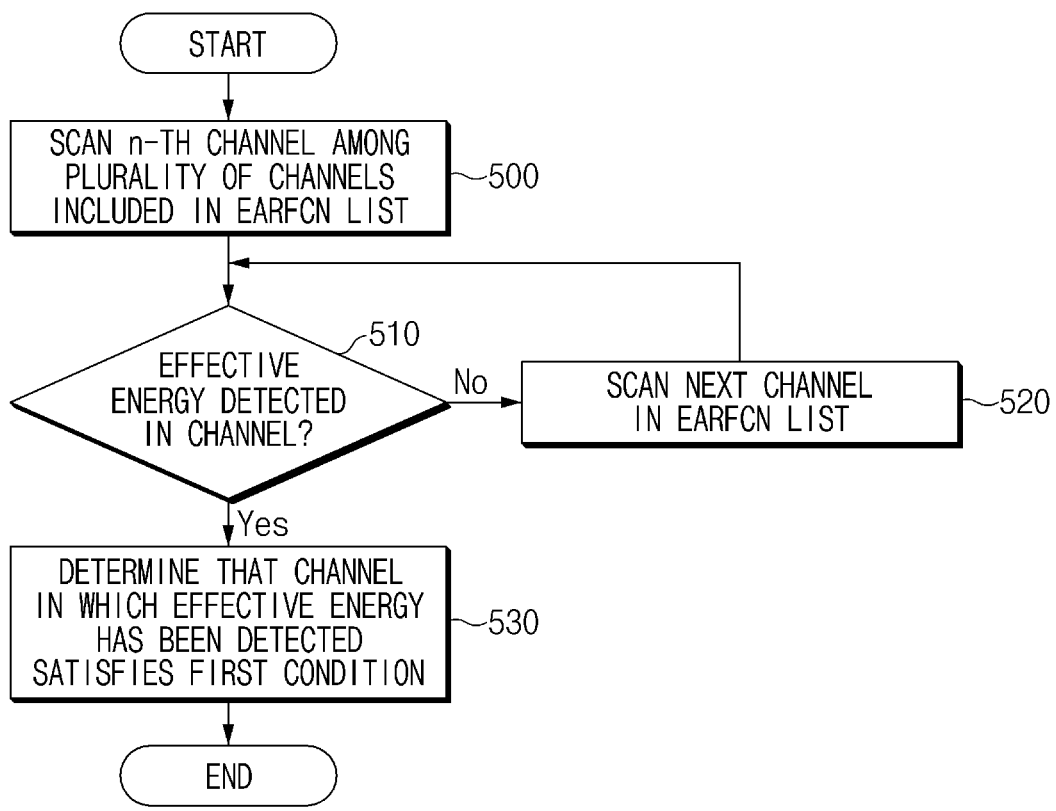
FIG. 5 is a flowchart illustrating a first condition of FIG. 3 according to an embodiment of the disclosure.

FIG. 5 is a flowchart illustrating a first condition of FIG. 3 according to an embodiment of the disclosure.

In operation 500, a processor (e.g., 210 of FIG. 2) may scan an n-th (n is a constant) channel (e.g., a first channel of FIG. 3) among a plurality of channels included in an EARFCN list. Descriptions related to 800c of FIG. 8 may be referenced with regard to the scanning of operation 500.

In operation 510, the processor 210 may identify whether effective energy has been detected from a channel For example, when strength of a signal received through the n-th channel is at least a threshold (e.g., received signal strength indicator (RSSI)=−100 dB), the processor 210 may determine that effective energy has been detected from the n-th channel In an embodiment, when strength of a signal received through the n-th channel is less than the threshold (e.g., RSSI=−100 dB), the processor 210 may determine that effective energy has not been detected from the n-th channel In another embodiment, when effective energy has not been detected from the channel (510-NO), the processor 210 may proceed to operation 520. In operation 520, the processor 210 may scan a next channel in the EARFCN list. After scanning the next channel, the processor 210 may return to operation 510 and perform operation 510 on the next channel In yet another embodiment, when effective energy has been detected from the channel (510-YES), the processor 210 may proceed to operation 530. In operation 530, the processor 210 may determine that the channel (e.g., the first channel of FIG. 3) in which effective energy has been detected satisfies the first condition.

The operations of FIG. 5 may be performed until a channel, including the n-th channel, in which effective energy is detected, is identified among the plurality of channels included in an EARFCN list. Unlike the illustration of FIG. 5, when all of channels included in the EARFCN list have been completely scanned without detecting effective energy in the channels (510-NO), the processor 210 may not proceed to operation 520. Descriptions related to FIG. 7 may be referenced with regard to this case.

Figure 6A:
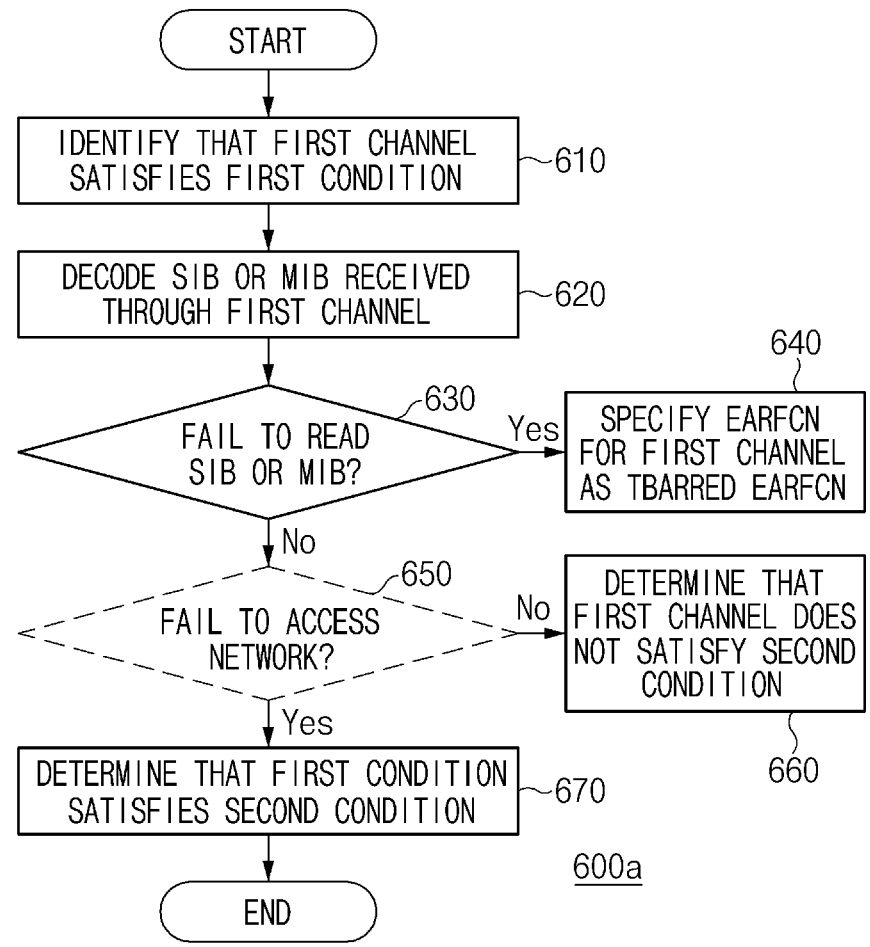
FIGS. 6A and 6B are flowcharts illustrating a second condition of FIG. 3 according to embodiments of the disclosure.
Figure 6B:
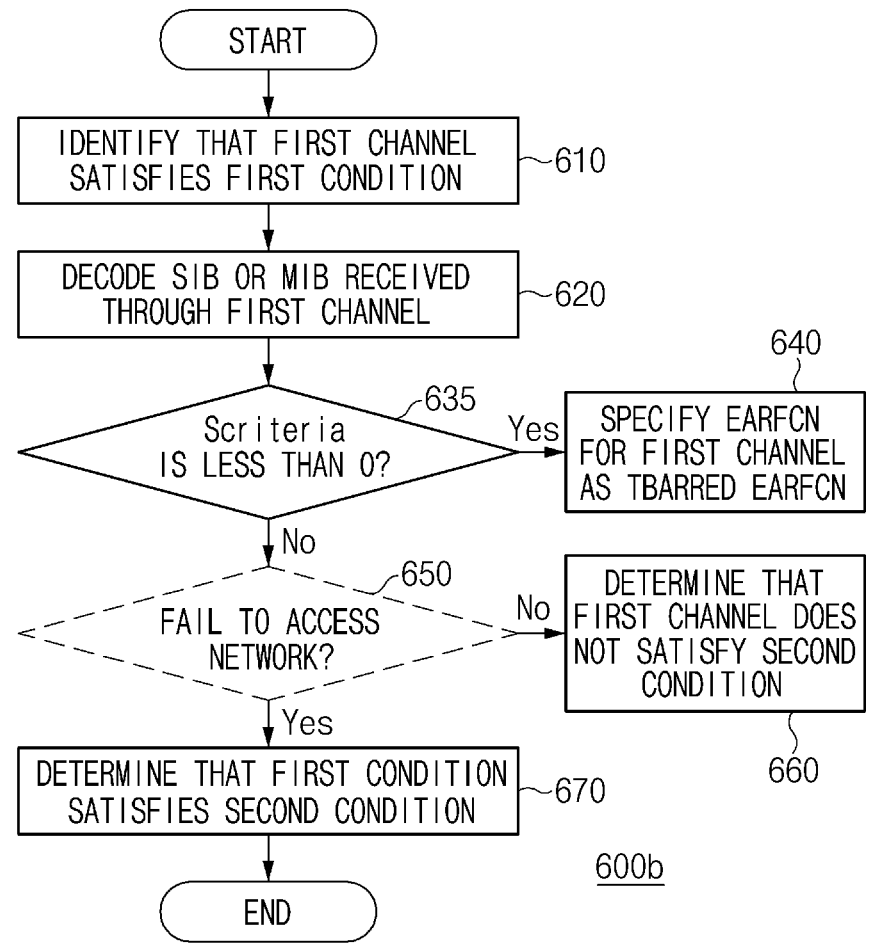

FIGS. 6A and 6B are flowcharts illustrating a second condition of FIG. 3 according to embodiments of the disclosure.

Referring to 600a of the flowchart, in operation 610, a processor (e.g., 210 of FIG. 2) may identify a first channel satisfying a first condition. Descriptions related to FIG. 5 may be referenced with regard to the first condition.

In operation 620, the processor 210 may decode an MIB or SIB received through the first channel In an embodiment, while the processor 210 is performing operation 620, loss of a data packet for D2D communication may occur.

In operation 630, the processor 210 may identify whether the electronic device 200 has failed to read the MIB or SIB. When the electronic device 200 is located at an edge of coverage of a cellular network, the electronic device 200 may fail to read the SIB since reception of a signal broadcast from a base station is unstable.

When the electronic device 200 has failed to read the MIB or SIB (630-YES), the processor 210 may proceed to operation 640. In operation 640, the processor 210 may set an EARFCN for the first channel as a Tbarred EARFCN barred for a preset time. For example, when the first channel is set as a Tbarred EARFCN, the processor 210 may not attempt to access a network through the first channel for a preset time.

In another embodiment, when the electronic device 200 has successfully read the MIB or SIB (630-NO), the processor 210 may proceed to operation 650. In operation 650, the processor 210 may identify whether the electronic device 200 has failed to access a network. The electronic device 200 may fail to access a network or may not attempt to access a network due to various reasons. For example, when a cellular network related to the first channel is a barred cellular network and/or is a cellular network that is unable to be accessed based on subscriber information of the electronic device 200, the processor 210 may not access the cellular network related to the first channel The processor 210 may identify whether the cellular network related to the first channel is a barred cellular network based on a result of decoding the MIB or SIB. Alternatively, the processor 210 may fail to access a network when a signal broadcast from the base station 250 includes a forbidden PLMN and/or tracking area identity (TAI). Operation 650 is optional and may be skipped.

When the processor 210 has successfully accessed a network (650-NO), the processor 210 may proceed to operation 660. In operation 660, the processor 210 may determine that the first channel does not satisfy the second condition. When the first channel does not satisfy the second condition, the processor 210 may proceed to operation 450 of FIG. 4 and may select the cellular network related to the first channel After selecting the cellular network related to the first channel, the processor 210 may switch the electronic device 200 to the on-network mode and perform cellular communication (e.g., LTE communication) using a wireless communication circuit (e.g., 230 of FIG. 2).

In still another embodiment, when the processor 210 has failed to access a network (650-YES), the processor 210 may proceed to operation 670. In operation 670, the processor 210 may determine that the first channel satisfies the second condition.

Descriptions related to the flowchart 600a may be referenced with regard to reference numbers in the flowchart 600b which are the same as those in the flowchart 600a. Referring to the flowchart 600b, in operation 635, the processor 210 may identify whether selection criteria Scriteria (e.g., reference value) is less than 0. When Scriteria is less than 0, the cellular network related to the first channel may be considered unsuitable to be selected. The processor 210 may calculate a Scriteria value (e.g., reference value) based on signal strength (e.g., reference signals received power (RSRP)) of a signal received through the first channel. In an embodiment, when Scriteria is less than 0 (635-YES), the processor 210 may proceed to operation 640. In another embodiment, when Scriteria is at least 0 (635-NO), the processor may proceed to operation 650.

Figure 7:
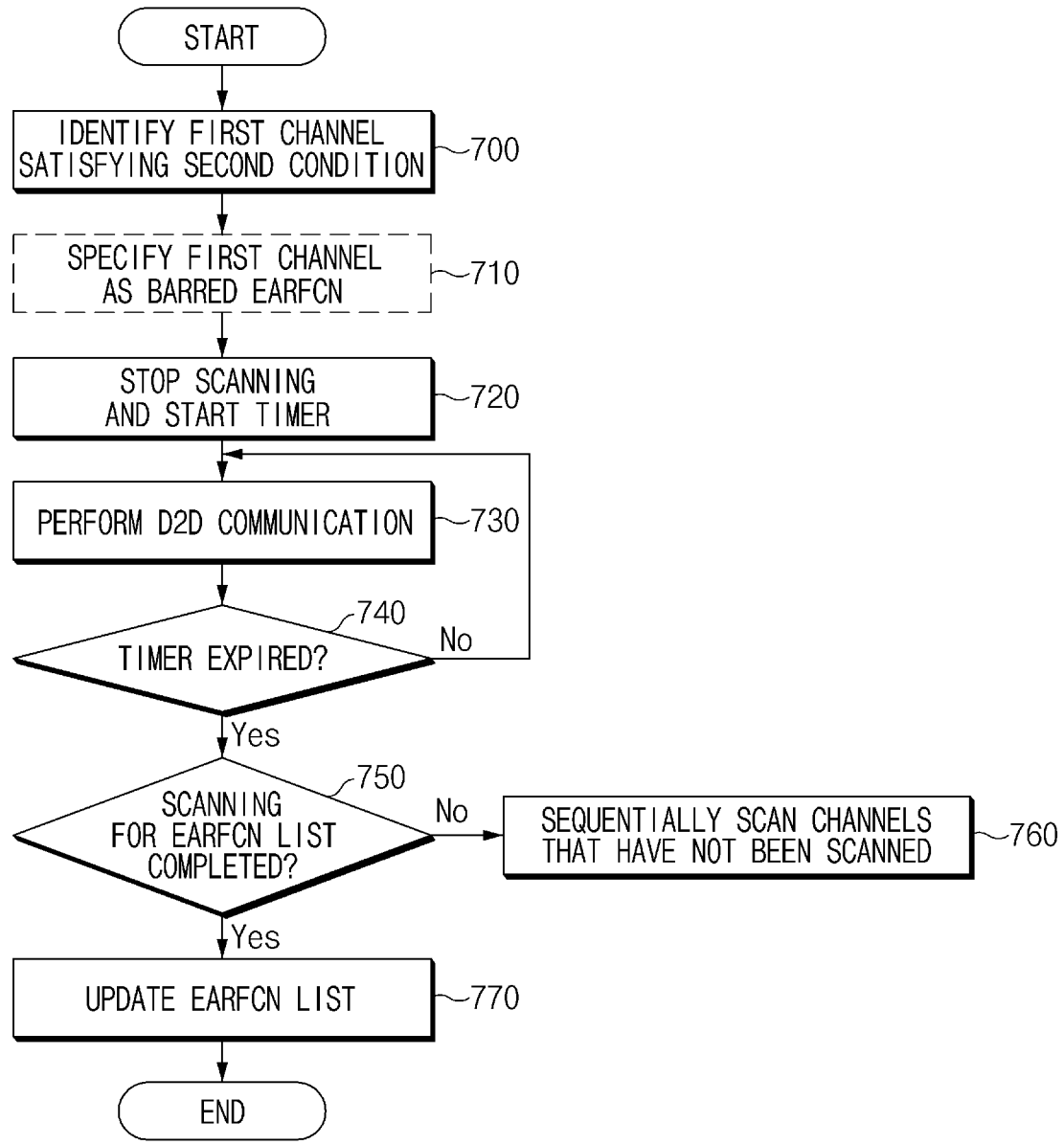
FIG. 7 is a flowchart illustrating a scanning method according to an embodiment of the disclosure.

FIG. 7 is a flowchart illustrating a scanning method according to an embodiment of the disclosure.

The operations of FIG. 7 may be construed as corresponding to operation 460 of FIG. 4.

Referring to operation 700, a processor (e.g., 210 of FIG. 2) may identify a first channel satisfying a second condition. Descriptions related to FIGS. 6A and 6B may be referenced with regard to the second condition.

In operation 710, the processor 210 may specify the first channel as a barred EARFCN. The processor 210 may not attempt to access a network through a cellular network related to the first channel Furthermore, when configuring an EARFCN list, the processor 210 may exclude an EARFCN for the first channel. Operation 710 is optional and may be skipped.

In operation 720, the processor 210 may stop scanning and start a timer. The timer may expire after elapse of a specified time. In an embodiment, when the processor 210 stops scanning, the processor 210 may not perform decoding of an MIB or SIB.

In operation 730, the processor 210 may perform D2D communication. For example, the processor 210 may receive a data packet for D2D communication from an external electronic device (e.g., 240 of FIG. 2). The external electronic device 240 may retransmit a data packet lost due to MIB or SIB decoding. Descriptions related to FIG. 8 may be referenced with regard to data packet retransmission.

In operation 740, the processor 210 may identify whether the timer has expired. In an embodiment, when the timer has not expired (740-NO), the processor 210 may return to operation 730 and continue to perform D2D communication.

When the timer has expired (740-YES), the processor 210 may proceed to operation 750. In operation 750, the processor 210 may identify whether scanning of the EARFCN list has been completed. For example, when all of channels included in the EARFCN list have been scanned, the processor 210 may determine that scanning of the EARFCN list has been completed.

In an embodiment, when scanning of the EARFCN list has not been completed (750-NO), the processor 210 may proceed to operation 760. In operation 760, the processor 210 may sequentially scan channels that have not been scanned.

In another embodiment, when scanning of the EARFCN list has been completed (750-YES), the processor 210 may proceed to operation 770. In operation 770, the processor 210 may update the EARFCN list. According to yet another embodiment, the processor 210 may return to operation 305 of FIG. 3 and reconfigure the EARFCN list. For example, the processor 210 may exclude a barred EARFCN from the EARFCN list. The processor 210 may exclude, from the EARFCN list, a Tbarred EARFCN that has not exceeded a preset time.

Figure 8:
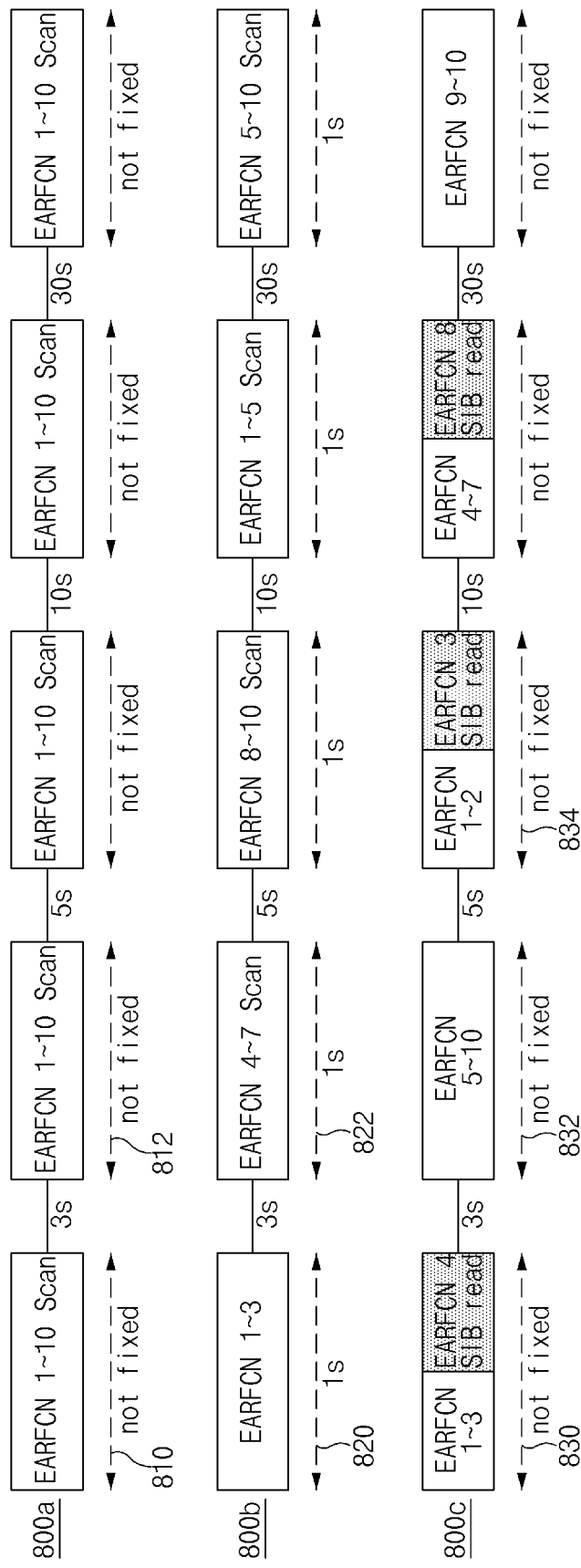
FIG. 8 illustrates a scanning method according to an embodiment of the disclosure.

FIG. 8 illustrates a scanning method according to an embodiment of the disclosure.

A processor (e.g., 210 of FIG. 2) may scan an EARFCN list using various methods. In an embodiment, a first method 800a and a second method 800b are examples of the various methods, and the electronic device 200 of the disclosure may perform scanning according to a third method 800c.

Referring to the first method 800a, the processor 210 may sequentially perform scanning for an entirety of the EARFCN list. After completing scanning, the processor 210 may stop scanning and may perform D2D communication with an external electronic device (e.g., 240 of FIG. 2) for a specified time. According to the first method 800a, the number of channels satisfying the first condition of FIG. 3 among channels included in the EARFCN list may change in each interval (e.g., 1-1st interval 810, 1-2nd interval 812). Since loss of a data packet may occur when decoding an MIB or SIB received through a channel satisfying the first condition, a probability of loss of a data packet may also change in each interval (e.g., 1-1st interval 810, 1-2nd interval 812). When the number of channels satisfying the first condition in the 1-1st interval 810 is larger than the number of channels satisfying the first condition in the 1-2nd interval 812, the probability of loss of a data packet in the 1-1st interval 810 may be higher than the probability of loss of a data packet in the 1-2nd interval 812.

Referring to the second method 800b, the processor 210 may perform scanning only for a fixed time (e.g., 1 second). In an embodiment, when a fixed time 810 has elapsed, the processor 210 may stop scanning and may receive a data packet for D2D communication from the external electronic device 240 for a specified time. For example, a length of a 2-1st interval 820 may be the same as a length of a 2-2nd interval 822. According to the second method 800b, the number of channels satisfying the first channel may change in each interval (e.g., 2-1st interval 820, 2-2nd interval 822). Therefore, the probability of loss of a data packet may also change in each interval. In another embodiment, when the number of channels satisfying the first condition in the 2-1st interval 820 is larger than the number of channels satisfying the first condition in the 2-2nd interval 822, the probability of loss of a data packet in the 2-1st interval 820 may be higher than the probability of loss of a data packet in the 2-2nd interval 822.

Referring to the third method 800c, the processor 210 may sequentially perform scanning until a channel satisfying the first condition is identified. When a channel satisfying the first condition is identified, the processor 210 may attempt to access a network related to the channel For example, in a 3-1st interval 830, the processor 210 may identify a fourth channel (e.g., channel corresponding to 4th EARFCN) satisfying the first condition as a result of sequentially scanning channels corresponding to first to fourth EARFCNs. In an embodiment, when the fourth channel satisfies the second condition after decoding an SIB received through the fourth channel, the processor 210 may stop scanning and may receive a data packet for D2D communication from the external electronic device 240 for a specified time. According to the third method 800c, MIB or SIB decoding may be performed at most one time in each interval (e.g., 3-1st interval 830, 3-2nd interval 832, 3-3rd interval 834). For example, the processor 210 may stop scanning after decoding the SIB received through the fourth channel in the 3-1st interval 830. For example, the processor 210 may not perform SIB decoding in the 3-2nd interval 832 since a channel satisfying the first channel is not identified. In another example, in the 3-3rd interval 834, the processor 210 may stop scanning when a third channel (e.g., channel corresponding to third EARFCN) satisfies the second condition after decoding an SIB received through the third channel Unlike the first method 800a and the second method 800b, the third method 800c may limit the probability of loss of a data packet to below a certain level.

According to an embodiment, the processor 210 may receive retransmission of a lost data packet from the external electronic device 240 for a specified time. The probability of loss of a data packet may further reduce. Descriptions related to FIG. 9 may be referenced with regard to data packet retransmission.

According to another embodiment, a specified time for which D2D communication is performed may be differently set. For example, according to the third method 800c, the processor 210 may perform D2D communication for three seconds (e.g., specified time) after scanning in the 3-1st interval 830. After scanning in the 3-2nd interval 832, the processor 210 may increase the specified time and perform D2D communication for five seconds. Since repeated scanning for the same channel may cause unnecessary power consumption, the processor 210 may increase the specified time as the number of scans increases, thereby reducing power consumption.

Figure 9:
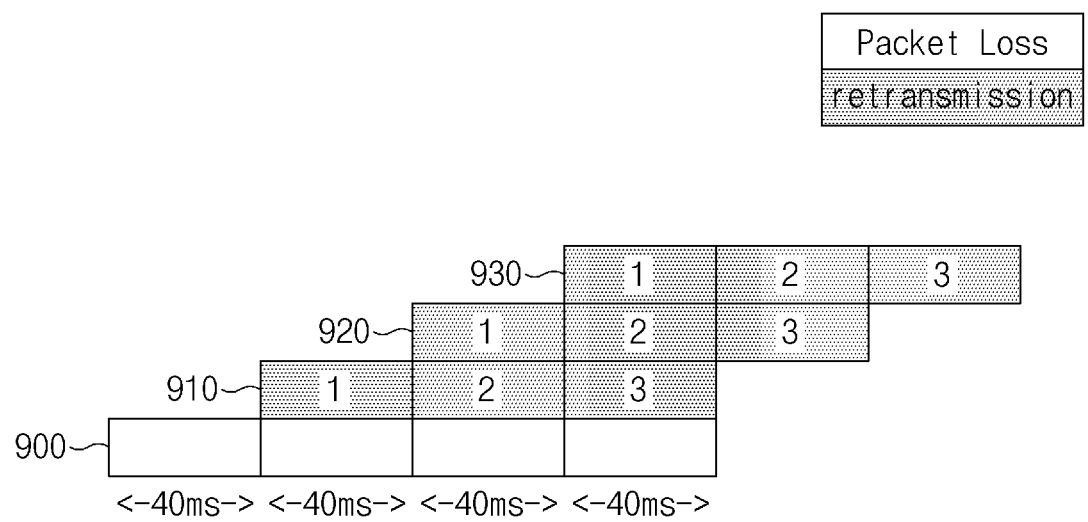
FIG. 9 illustrates retransmission of a data packet for D2D communication according to an embodiment of the disclosure.

FIG. 9 illustrates retransmission of a data packet for D2D communication according to an embodiment of the disclosure.

According to an embodiment, when a processor (e.g., 210 of FIG. 2) has failed to access a network (e.g., operation 650-YES of FIGS. 6A and 6B), a processor 210 may receive a data packet for D2D communication from an external electronic device (e.g., 240 of FIG. 2). The external electronic device 240 may retransmit a data packet lost due to MIB or SIB decoding. According to a 3GPP ProSe standard (e.g., TS 24.379), during D2D communication, the processor 210 does not notify the external electronic device 240 that a data packet has been received, and thus the external electronic device 240 may retransmit the same data to the electronic device 200 a specified number of times in preparation for loss of a data packet for D2D communication.

According to another embodiment, a time required for the processor 210 to decode an MIB or SIB received through a first channel (e.g., the first channel of FIG. 3) may be referred to as 150 to 300 millisecond (ms). For convenience, the time required for the processor 210 to decode an MIB or SIB is assumed to be 160 ms. In FIG. 9, a time interval in which the processor 210 decodes a received MIB or SIB may be referred to as a block 900. Therefore, a data packet for D2D communication may be lost during a time corresponding to the block 900.

According to yet another embodiment, the external electronic device 240 may retransmit a data packet at an interval of preset time (e.g., 40 ms). When the external electronic device 240 is configured to retransmit the same data three times, the external electronic device 240 may retransmit a data packet three times during 120 ms. According to a first retransmission time of a data packet, a retransmission interval may be referred to as a block 910, block 920, or block 930.

According to still another embodiment, when a data packet transmission interval of the external electronic device 240 is like the block 910, the processor 210 may be unable to receive all of retransmitted data packets.

When the data packet transmission interval of the external electronic device 240 is like the block 920 and the block 930, the processor 210 may receive retransmission of a lost data packet after completing decoding of an MIB or SIB. For example, in the case of the block 920, the processor 210 may receive a data packet retransmitted for the third time after stopping scanning. For example, in the case of the block 930, the processor 210 may receive a data packet retransmitted for the second time and/or third time after stopping scanning In this case, as a result, loss of a data packet due to MIB or SIB decoding may not occur.

In an embodiment, when data packet retransmission is like the block 910, loss of a data packet may occur in spite of scanning according to the third method 800c of FIG. 8. However, when data packet retransmission is like the block 920 and the block 930, the processor 210 may receive a retransmitted data packet, and thus the third method 800c may be useful.

Figure 10:
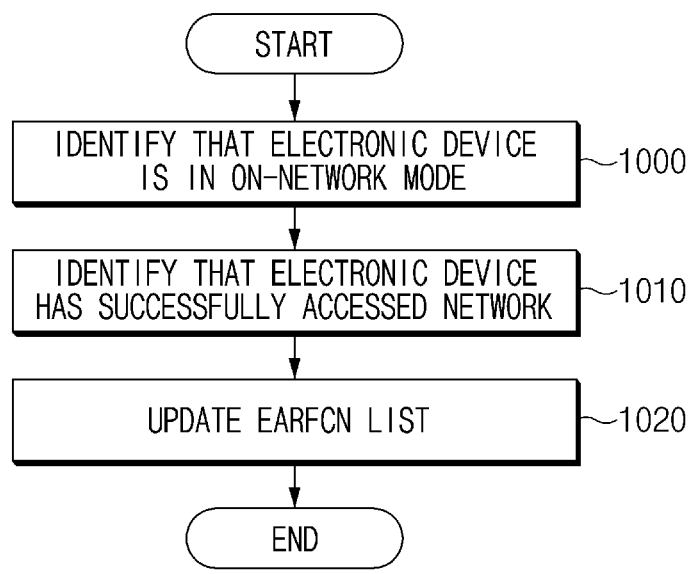
FIG. 10 is a flowchart illustrating an electronic device in an on-network mode according to an embodiment of the disclosure.

FIG. 10 is a flowchart illustrating an electronic device in an on-network mode according to an embodiment of the disclosure.

In operation 1000, a processor (e.g., 210 of FIG. 2) may identify that an electronic device (e.g., 200 of FIG. 2) is in an on-network mode. The on-network mode may be construed as a mode in which the electronic device 200 is connected to a base station and able to perform cellular communication (e.g., LTE). For example, operation 1000 of FIG. 10 may be performed after the processor 210 proceeds to operation 450 of FIG. 4.

In operation 1010, the processor 210 may identify that the electronic device 200 has successfully accessed a network. When the electronic device 200 has successfully accessed a network, the processor 210 may perform cellular communication using a wireless communication circuit (e.g., 230 of FIG. 2).

In operation 1020, the processor 210 may update the EARFCN list. The EARFCN list updated in operation 1020 may be used as an EARFCN list of the electronic device 200 that has succeeded in registering with an existing network (or accessing a network) in operation 305 of FIG. 3.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a wireless communication circuit;
a memory, in which an evolved-universal terrestrial radio access (E-UTRA) absolute radio frequency channel number (EARFCN) list is stored; and
at least one processor operatively connected to the wireless communication circuit and the memory,
wherein the at least one processor is configured to:
identify whether the electronic device is in a specified mode,
sequentially perform scanning at least a portion of a plurality of channels included in the EARFCN list when the electronic device is in the specified mode,
identify a first channel satisfying a first condition from a result of the scanning,
identify whether the first channel corresponds to a second condition for accessing a cellular network for the first channel by decoding a system information block (SIB) or master information block (MIB) received through the first channel,
select the cellular network for the first channel when the first channel corresponds to the second condition, and
stop, for a specified time, scanning the plurality of channels and perform device-to-device (D2D) communication for the specified time when the first channel does not correspond to the second condition.

2. The electronic device of claim 1, wherein the first condition includes a condition that strength of a signal received through at least a portion of the plurality of channels be at least a first threshold.

3. The electronic device of claim 1, wherein the first channel does not correspond to the second condition when a reference value for selecting the cellular network is less than 0, or when the at least one processor fails to read the SIB or the MIB or.

4. The electronic device of claim 3, wherein the at least one processor is further configured to specify the first channel as a barred EARFCN for a preset time when the first channel does not correspond to the second condition.

5. The electronic device of claim 3, wherein the at least one processor is further configured to specify the first channel as a barred EARFCN when the electronic device has failed to access the selected cellular network.

6. The electronic device of claim 1, wherein the at least one processor is further configured to increase the specified time as the number of scans increases.

7. The electronic device of claim 1, wherein the at least one processor is further configured to:
identify whether scanning of the EARFCN list has been completed after elapse of the specified time,
update the EARFCN list when scanning of the EARFCN has been completed, and
store the updated EARFCN list in the memory.

8. The electronic device of claim 1, wherein the at least one processor is further configured to:
identify whether scanning of the EARFCN list has been completed after elapse of the specified time, and
when scanning of the EARFCN list has not been completed, sequentially perform scanning channels which have not been scanned among the plurality of channels included in the EARFCN list.

9. The electronic device of claim 1, wherein the at least one processor is further configured to update the EARFCN list when the cellular network for the first channel is selected.

10. A method of operating an electronic device, the method comprising:
identifying whether the electronic device is in a specified mode;
sequentially performing scanning at least a portion of a plurality of channels included in an evolved-universal terrestrial radio access (E-UTRA) absolute radio frequency channel number (EARFCN) list when the electronic device is in the specified mode;
identify a first channel satisfying a first condition is from a result of the scanning;
identifying whether the first channel corresponds to a second condition for accessing a cellular network for the first channel by decoding a system information block (SIB) or master information block (MIB) received through the first channel;
selecting the cellular network for the first channel when the first channel corresponds the second condition; and
stopping, for a specified time, scanning the plurality of channels and performing device-to-device (D2D) communication for the specified time when the first channel does not correspond to the second condition.

11. The method of claim 10, further comprising:
identifying whether scanning of the EARFCN list has been completed after elapse of the specified time; and
updating the EARFCN list when scanning of the EARFCN has been completed.

12. The method of claim 10, further comprising:
identifying whether scanning of the EARFCN list has been completed after elapse of the specified time; and
when scanning of the EARFCN list has not been completed, sequentially performing scanning channels which have not been scanned among the plurality of channels included in the EARFCN list.

13. The method of claim 10, further comprising: updating the EARFCN list when the cellular network for the first channel is selected.

14. The method of claim 10, further comprising: increasing the specified time as the number of scans increases.

15. The method of claim 10, wherein the first condition includes a condition that strength of a signal received through at least a portion of the plurality of channels be at least a first threshold.

16. The method of claim 10, wherein the first channel does not correspond to the second condition when a reference value for selecting the cellular network is less than 0, or when the electronic device fails to read the SIB or the MIB.

17. The method of claim 16, further comprising:
specifying the first channel as a barred EARFCN for a preset time when the first channel does not correspond to the second condition.

18. The method of claim 16, further comprising:
specifying the first channel as a barred EARFCN when the electronic device has failed to access the selected cellular network.

* * * * *